B. J. La Mothe.

Impd R.R. Car.

No 360.

Reissued Mch. 18. 1856.

Witnesses:

A. S. Lincoln

Lewis W. Serell

Inventor:

B. J. La Mothe

UNITED STATES PATENT OFFICE.

B. J. LA MOTHE, OF NEW YORK, N. Y.

IMPROVEMENT IN RAILROAD-CARS.

Specification forming part of Letters Patent No. 10,721, dated April 4, 1854; Reissue No. 360, dated March 18, 1856.

*To all whom it may concern:*

Be it known that I, BERNARD JOACHIM LA MOTHE, of the city, county, and State of New York, have invented, made, and applied to use certain new and useful Improvements in Cars for Railroads, which I term the "Life-Preserving Car;" and I do hereby declare that the following is a full, clear, and exact description of the construction and operation of the same, reference being had to the annexed drawings, making part of this specification, wherein—

Figure 1:
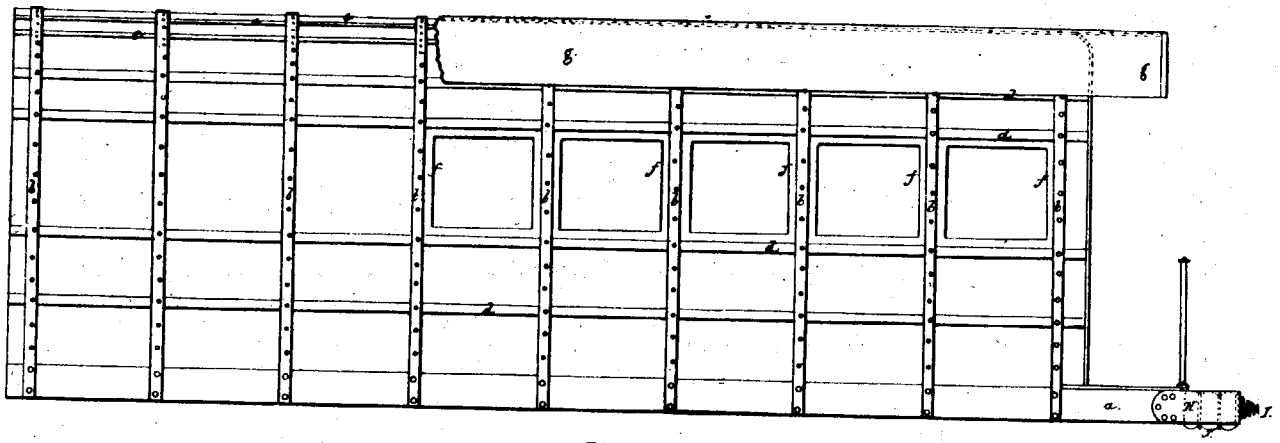
Figure 2:
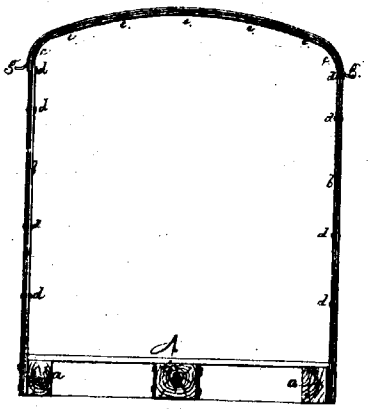

Figure 1 is a side elevation of a portion of the car at one end, and Fig. 2 is a cross-section of the same.

Similar marks of reference denote the same parts.

In the construction of lattice-bridges and metallic girders various methods have been resorted to for obtaining a very rigid and unyielding structure by means of metallic bars intersecting and crossing each other, and riveted together at the intersections. In these cases the object alone is to obtain the most rigid structure comparatively, disregarding weight. This character of structure would not answer for railroad-cars, because in cases of collision the rigidity of the parts, in addition to their weight and momentum, would break and almost demolish such cars, besides which their cost and the wear on the rails in consequence of the weight would preclude their use. It is also known that where two, three, or more metallic bars or bands are riveted together the liability to break is lessened from that of a solid bar of corresponding size and weight; hence my invention is not in developing this fact, and carriage-bodies have heretofore been made of single metallic strips crossing each other and riveted together, but in this case very little strength is obtained.

The three requirements for railroad-cars are, first, lightness; second, strength; third, slight elasticity or toughness, as distinguished from rigidity, thereby providing against accidents in cases of collision by preventing the structure from being either broken up or considerably indented or smashed, which would in either instance be nearly equally destructive to life.

My invention, by which I am enabled to obtain practically a life-preserving car, does not relate to the features of either one of the before-mentioned structures, but consists in making use of metallic bands passing between other metallic bands, so that there shall not be less than three thicknesses at the intersection, and the transverse bands bent at the angle between the roof and sides, and the several bands running in one direction, two or more together, being riveted or attached together at proper distances, thereby obtaining the three requirements for railroad-car framing of lightness, strength, and elasticity or toughness, which new and useful result I am not aware of ever before having been attained in the important structure of a railroad-car, as set forth.

In the annexed drawings a platform is shown as constructed with a strong center beam, A, and suitable side beams or sills, *a a*, all of which are to be securely fastened together and banded with metal around the outside; and I prefer that the platforms at the ends of the car should be provided with arched springs of metal H, and with india-rubber springs at J, so as to receive any concussion, and spiral springs may also be used, as at I, to assist in relieving the platforms and body of the car in cases of collision or accident.

It is well known that all the weight of railroad passenger and freight cars is borne by the floors and platforms, the upper parts being of a character scarcely more than competent to sustain their own weight; hence the same become, principally, coverings to retain and protect the contents of the cars. Where these upper parts are made of wood, considerable weight is added to the car without increasing its strength to bear the load it contains, and in cases of accident these brittle frames are broken into fragments and inflict more personal injury than the actual concussion consequent upon the speed of the train; hence I desire that the platforms and floors of the cars (the only parts which really resist concussion) be formed very strongly, and provided with competent springs at the ends, while the upper parts of the car, to which my invention relates, be formed as a light, strong, permanent, and elastic inclosure that will not vibrate under the motion of the train, neither will crush down in cases of collision, but be elastic, slightly yielding to great pressure, and then springing back to the proper form. At the same time the sides act to strengthen and support the platform and the load thereon. To accomplish these purposes I form the frame-work of my car of transverse sections or ribs *b b*, each composed of two or more thicknesses or bands of metal attached firmly to the platform, and extended up and bent at the angle between the roof and sides into nearly a quarter-circle, and attached to or extended across, forming the roof of the car.

By the peculiar character of these ribs *b b*, running crosswise of the car, it will be seen that lateral vibration or swaying is effectually prevented, because the two or more bands or thicknesses of metal, (which I prefer to be flat steel bands on account of their elasticity when united in the manner shown, although other sectional forms might be used,) when they are riveted together and to the other parts of the frame-work, as hereinafter detailed, become very stiff in themselves, and cannot easily be bent between the platform and the angle between the roof and sides of the car; but if the sides were simply riveted or fastened onto the roof at the angle, the constant vibration of the car would work the parts loose; hence I form the metallic bands at this point as nearly a quarter-circle, *c*, permanently connecting the sides and roof, and that without any joining of the bars at the very angle between the roof and sides, where the strain ordinarily causes the frame-work to become loose and insecure.

I prefer that the metallic bands forming the ribs be of one piece running from one side to the other, with the ends firmly attached at the platform or center beam; but where more convenient the bands may be joined, care being taken to make the joint where least subjected to strain.

Between the vertical bands forming the ribs *b*, crosswise of the car, I insert one or more horizontal bands or bars, *d*, running continuously, or jointed at the required length, along the sides of the car, being bent at the angles between the sides and ends and attached to the metallic door-posts or other parts, according to the peculiar construction of the ends of the cars and the doors in them; and the bands *e*, which run along the roof of the car connecting the ribs *b* to each other, are to be bent and passed down between or at the sides of the horizontal bands *d* at the ends of the car. The parts of the framing thus formed are to be securely riveted or fastened together at each intersection of the bands, and the transverse bands forming the ribs *b* are themselves to be riveted or secured together at suitable distances, so as to strengthen and stiffen the same. The horizontal bands *d* and the cross-frames or ribs *b* are to be placed at proper distances for leaving the necessary spaces for windows *f*, and by the arrangement of these horizontal bands *d* and *e*, and, being firmly connected to the transverse bands which are attached to the platform, they add additional strength to the car and aid in supporting the weight carried on the platform, because said platform cannot give down or bend without bending the longitudinal bands *d* at the same time; and it will be evident that the cars, being lighter, there is less force of concussion in cases of collision; and, moreover, when this difference of weight is taken in connection with the strength and elasticity of the life-preserving car, great protection is afforded against personal injury in accidents to the train, and by this mode of construction the beauty and symmetry of the car is not injured, but rather increased.

The spaces on the sides of the car not occupied by windows or doors, as well as the roof *g*, are to be closed in by suitable metal or other panels or sheets, so as to complete the car; and the windows, doors, and internals fittings may be of any desired character, and for passenger-cars the inside should be lined throughout with suitable cushions or padding, to protect the inmates from injury in cases of collision.

By reference to the commencement of this specification it will be seen that the separate features—of three thicknesses, continuous bands, and bars riveted together throughout their length—are well known; hence it might be argued that it did not require invention to apply these three features together in a railroad-car. It cannot be questioned that these three features have never before my invention been applied together, therefore the question turns on the patentability of such combination of these individually-known features of other structures in a railroad-car.

It is a well known and thoroughly established fact in the judicial enactments relative to patents that the result attained becomes in many instances the measure of patentability.

The result attained in my cars, and which has never before been attained in similar structures, is lightness, strength, and an elastic toughness, the three essential requirements of railroad-cars, and without which metallic cars become what they have heretofore been, life-destroyers instead of life-preservers; and these great advantages are attained by the combined use of the three before-described features of construction which have before been separately used in other structures. And in addition to the above points of invention, the fact should have weight that various other plans have been proposed for constructing railroad passenger-cars of iron without as yet any known success; and success having been attained by this plan, demonstrating practically the results heretofore set forth, it becomes apparent that my success must be predicated on points of invention not heretofore developed in railroad-cars.

What I claim as my invention, and desire to secure by Letters Patent, is—

The construction of the frames of railroad-cars substantially in the manner and for the purposes specified.

In witness whereof I have hereunto set my signature this 12th day of September, 1855.

B. J. LA MOTHE.

Witnesses:
H. S. LINCOLN,
LEMUEL W. SERRELL.